United States Patent [19]

Esterl et al.

[11] 4,360,444
[45] Nov. 23, 1982

[54] GETTER BODY

[75] Inventors: Robert Esterl, Reinstorf; Josef Weiser, Hohenschaeftlarn, both of Fed. Rep. of Germany

[73] Assignee: Siemens Aktiengesellschaft, Berlin & Munich, Fed. Rep. of Germany

[21] Appl. No.: 239,571

[22] Filed: Mar. 2, 1981

[30] Foreign Application Priority Data

Mar. 4, 1980 [DE] Fed. Rep. of Germany ....... 3008290
Jan. 15, 1981 [DE] Fed. Rep. of Germany ....... 3101128

[51] Int. Cl.³ .............................................. H01J 7/18
[52] U.S. Cl. ............................. 252/181.1; 252/181.6; 313/480; 313/481; 200/302
[58] Field of Search ............... 252/181.1, 181.3, 181.4, 252/181.6, 181.7, 188.3 R; 313/174, 178, 179, 479–481; 316/3, 25; 428/346, 349; 200/302

[56] References Cited

U.S. PATENT DOCUMENTS

| | | | |
|---|---|---|---|
| 2,626,930 | 1/1953 | Savage | 252/181.1 |
| 3,485,343 | 12/1969 | Jorgensen | 252/181.6 |
| 3,584,253 | 6/1971 | Winter | 252/181.6 |
| 4,045,367 | 8/1977 | Van Bakel et al. | 252/181.7 |
| 4,047,071 | 9/1977 | Busch et al. | 252/181.6 |
| 4,077,899 | 3/1978 | Van Gils | 252/181.7 |
| 4,092,263 | 5/1978 | Zavitsanos | 252/181.7 |
| 4,146,497 | 3/1979 | Barosi et al. | 252/181.6 |
| 4,203,049 | 5/1980 | Kuus | 252/181.6 |
| 4,209,752 | 6/1980 | Bridges | 252/181.6 |
| 4,264,280 | 4/1981 | Hellier | 252/181.1 |

FOREIGN PATENT DOCUMENTS 2320618 11/1974 Fed. Rep. of Germany.

*Primary Examiner*—J. L. Barr
*Attorney, Agent, or Firm*—Hill, Van Santen, Steadman, Chiara & Simpson

[57] ABSTRACT

A getter body for use in encapsulated electrical components is of the type consisting of a powder mixture which has been compressed into tablet form. The powder mixture contains in addition to traditional getter material such as activated carbon, zeolite or the like, aluminum stearate and a binder containing a synthetic such as a polyamide. The getter body is produced in several sequential steps. The getter material is mixed with a polycarbonate or a water glass solution, which is then dried and then pulverized. To this first powder is added the aluminum stearate and the binder containing a synthetic. The resulting powder may then be dried and is then pressed into tablets. The tablets may then be heat-cured and are then surfaced polished. The resulting tablets have good abrasion resistance without a noticeable loss in the getter effectiveness.

1 Claim, 1 Drawing Figure

MANUFACTURING PROCESS OF THE GETTER BODIES

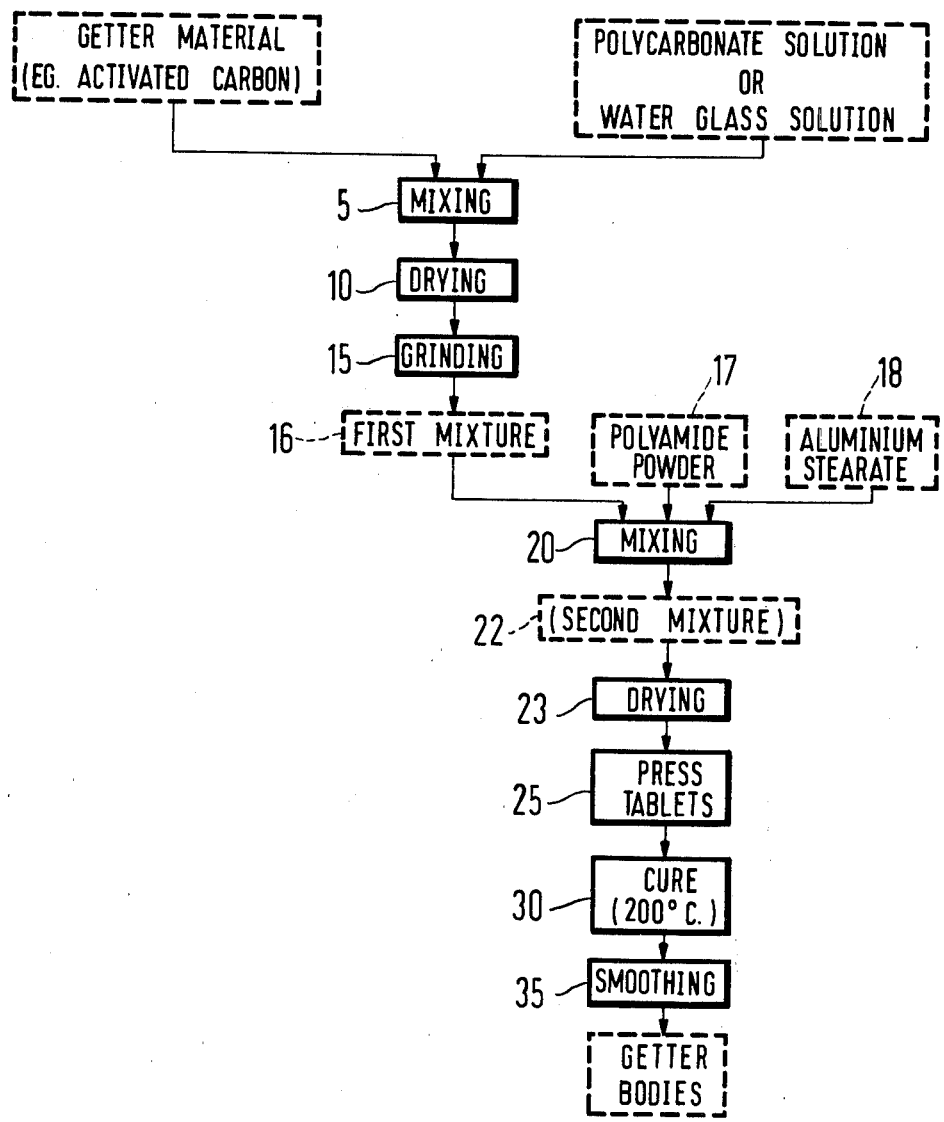

GETTER BODY

BACKGROUND OF THE INVENTION

1. Field of the Invention

The present invention relates to a getter body for use in encapsulated electrical components and a method for its manufacture. More particularly, the present invention relates to such a getter body in the form of a compressed tablet having, as an active component, a known getter material such as activated carbon, zeolite, or other like substances.

2. Description of the Prior Art

Electrical components such as relays are often hermetically encapsulated in order to protect the contacts against harmful environmental influences. However, it usually cannot be avoided that residual harmful gases and vapors remain in the airspace inside the capsule or are created there over time and have a negative influence on the functionability of the component. In order to absorb such harmful substances, it has long been standard to enclose getter bodies in the housing (German OS. No. 2,3201,618 may be seen in this regard). Such getter substances as, for example, activated carbon, zeolite and others increase the life expectancy and reliability of relays and other components. These getter substances are usually compressed into tablet shape and then glued to the housing wall on the inside of the component or otherwise secured with the suitable devices. It is important that the getter tablets have porous surfaces which are as great as possible. However, it is precisely in this porous consistency of the getter substances that one encounters a problem. These porous getter materials tend to crumble and, particularly where the component is jolted, there is chance that dust particles of the getter substance will reach the contacts and cause precisely what they were meant to prevent, namely, a contamination of the contact surfaces.

BRIEF DESCRIPTION OF THE DRAWING

The FIGURE is a schematic representation of a method of manufacture of getter bodies according to the present invention.

SUMMARY OF THE INVENTION AND DESCRIPTION OF THE PREFERRED EMBODIMENTS

The present invention has as an underlying objective to create a getter body in which the getter material is able to maximize its absorbitivity, while the getter body itself is substantially resistant to abrasion.

The resolution of this objective is obtained under the present invention by providing such a getter body which consists of a powder mixture having up to 70% by weight of the getter material, approximately 10% by weight aluminum stearate, with the remaining binder portion containing a synthetic.

The means of the inventive additions of the synthetic and aluminum stearate, the compressed getter tablets are thereby made largely abrasion-proof. These getter bodies can be manufactured in any geometrical shape by means of pressing the powdery mixture. They can be further processed as bulk material without problems and can be employed in a great variety of components without the functioning of the component being disrupted due to interference caused by crumbling particles.

The binder portion of the inventive powder mixture of the getter body containing one or more synthetics can vary between 20% and 80% by weight, depending on the particular case. Said remainder (binder portion) can either consist entirely of synthetics, whereby it is expediently composed of approximately 10% by weight polycarbonate and approximately 90% by weight polyamide or, in another advantageous embodiment, a water glass solution (a potassium- and sodium-silicate solution) may be employed instead of the polycarbonate. The binder portion would then consist of approximately 10% by weight water glass and approximately 90% by weight polyamide.

An advantageous method for manufacturing the inventive getter body first consists of providing the getter substance in powdery form and introducing it into a solution, for example, mixing it with polycarbonate solution as shown at mixing step 5 in the FIGURE, forming a solution. The solution is then dried as at drying step 10 and ground into a powder at grinding step 15 forming a first mixture 16. The powderized first mixture is then mixed at mixing step 20 with a polyamide powder 17 and aluminum stearate 18 in order to form a second mixture 22. From this second mixture, getter body tablets may then be pressed as at step 25. Under this method, the finished getter body contains the synthetics polyamide and polycarbonate. Methylene chloride may be employed as a solvent for the polycarbonate.

The use of methylene chloride as well as other solvents for the synthetics, has the disadvantage that under certain conditions during processing, it can produce noxious odors and also because of its toxicity, it represents a certain health hazard for the people working with it. For these reasons, it is expedient in certain cases to employ a water glass solution (potassium- and sodium-silicate solution) instead of the polycarbonate solution. The water glass solution is odor-free and non-toxic. Under this method, the finished getter body then only contains polyamide as the synthetic with the water glass in addition thereto. Otherwise, the method of manufacturing is exactly as in the preceding case.

In some instances, it may prove expedient to dry the second mixture before the pressing of the tablets. This drying can conveniently occur by means of heating the second mixture to a temperature of approximately 60° C. in drying step 23. Preferably, the pressed tablets are then cured in a further curing method step 30, using temperatures of approximately 200° C. It is also expedient to tumble-polish the finished getter bodies after the drying or curing in a smoothing step 35 in order to remove ridges or loose particles from their surfaces and to separate any getter bodies which are adhering to one another. To this end, triangularly-shaped stones may conveniently be placed in a drum with the getter bodies and water.

The getter bodies obtained in such manner exhibit very good abrasion-resistant surfaces without a noticeable loss of the getter effect. The getter bodies are activated in the usual manner by means of heating before or after insertion into the particular electrical component.

While we have disclosed an exemplary structure and method to illustrate the principles of the invention, it should be understood that we wish to embody within the scope of the patent warranted hereon all such modifications as reasonably and properly come within the scope of our contribution to the art.

The optimum getter-body is given by a good getter-capacity and a good mechanical solidity. The getter-capacity depending also on getter-porosity of the getter-body, increases by increasing the amount of getter material, while the mechanical solidity increases by increasing the amount of the plastic portion in the getter-body. The best compound lies between:

42.5 weight % — 52.5 weight % getter-material
52.5 weight % — 42.5 % plastic-material.

The amount of 5 weight % of aluminum stearate in this compound-region is held constant.

We claim as our invention:

1. In an improved getter body for use in encapsulated electrical components consisting of a compressed tablet from a powder mixture having as an active component a getter material the improvement of which comprises:
   a getter body powder mixture consisting essentially of
   a getter material in the amount of up to 70 percent by weight;
   aluminum stearate in the amount of approximately 10 percent by weight;
and
   a binder consisting essentially of polyamide and a compound selected from the group consisting of polycarbonate and potassium- and sodium-silicate solutions, said binder comprising approximately 10 percent by weight of polycarbonate or potassium- and sodium-silicate solution and approximately 90 percent by weight of polyamide.

* * * * *